UNITED STATES PATENT OFFICE 2,661,167

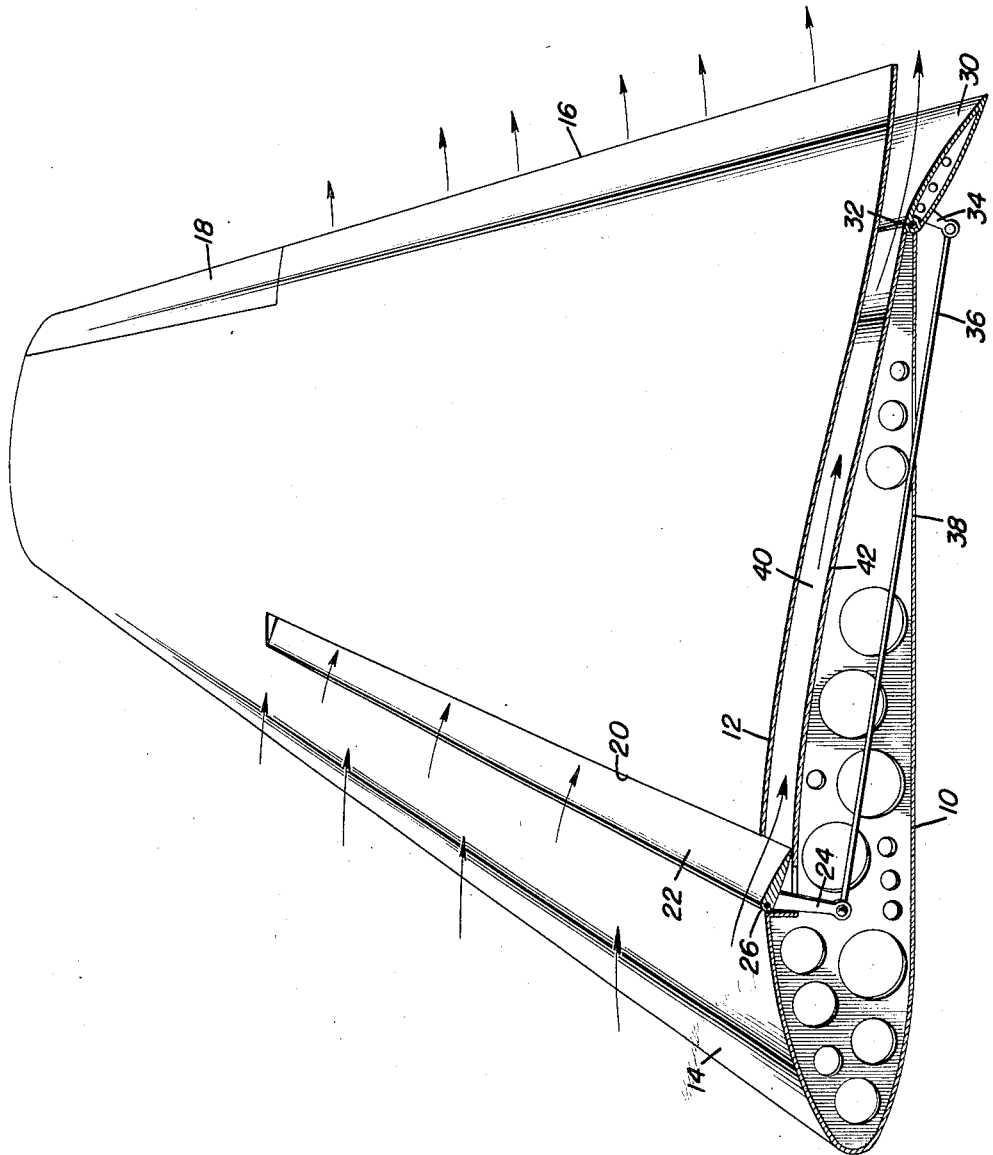
Morris E. Clark
*INVENTOR.*

AIRPLANE WING CONSTRUCTION WITH PASSAGE FROM UPPER SURFACE TO TRAILING EDGE

Morris E. Clark, Winslow, Ariz.

Application April 3, 1950, Serial No. 153,567

1 Claim. (Cl. 244—42)

This invention relates to improvements in airfoils. An object of this invention is to reduce landing and take-off speeds of an aircraft by modifying the airflow over and under the airfoil through the medium of the wing structure which has an air duct therein opening at substantially the point of maximum camber for inlet and which discharges air through the lower surface of the airfoil adjacent the trailing edge thereof.

Another object of this invention is to synchronize the valve which controls the inlet for the air passage or air duct, and a landing flap which is disposed at the trailing edge of the airfoil, the landing flap forming another valve for the air passageway or duct.

Ancillary objects and features will become apparent in following the description of the illustrated form of the invention.

In the drawing, the figure is a perspective view of a typical airfoil of the construction of one form of the invention.

The illustrated airfoil includes a member 10 forming the bottom surface and a member 12 forming the upper surface thereof. The airfoil has a leading edge 14 and a trailing edge 16. The aileron 18 is carried by the wing and serves its usual function.

The member 12 has a spanwise slot 20 therein which is spaced from the leading edge and also from the trailing edge and which is located at substantially the point of maximum camber of the wing. A valve 22 is disposed in the slot 20 and has an operating lever 24 fixed thereto and depending within the structure of the wing. The operating lever illustrated is one of several, the number being dependent upon design factors. This lever is mounted on a pivot pin 26 which may be secured to any suitable and conventional control assembly in order to pivotally operate the valve 22.

The lower member 10 terminates in front of the rear edge of the upper member 12 and there is a flap 30 connected pivotally as at 32 to the lower member 10. This flap has a horn 34 extending therefrom and a link 36 is pivoted thereto. This link is also secured to the lever 24 after passing through a slot 38 formed in the member 10. By virtue of the presence of the link 36, the flap 30 and the valve 22 are operated simultaneously.

Means forming an air duct or an air passageway 40 is disposed in the wing construction. This means consists of a sheet-like member 42 which is disposed on structural members, as the ribs of the wing. It is spaced from the bottom surface of the member 12 so as to conduct air from the slot 20 inlet to be discharged through the rear opening thereof which is controlled by the flap 30.

The area of the slot 20 is substantially twice that of the cross sectional area of the passage 40, to, in effect, form a venturi.

By operating the flap 30 synchronously with the valve 22, the pilot of the aircraft may control the venturi action of the passage 40. By having the column of air passing through the passage 40 exhaust at the trailing edge of the wing, this air passes into the low pressure area behind the trailing edge of the airfoil, thus reducing inherent airfoil drag. The low pressure area at the trailing edge of the wing acts to draw the air thru the passage 40, taking it from the upper surface of the airfoil, behind the leading edge thereof. In utility of this construction, the increase of lift is appreciable at all speeds, and accordingly, higher wing loadings may be safely used.

In order to determine the number of slots 20 and the size of the air passage 40 with relation to the slots 20, design factors, as wing loading desired, size of the aircraft, and others, must be taken into consideration.

Having described the invention, what is claimed as new is:

In an aircraft wing which has a first member forming an upper surface and a second member forming a lower surface, said first member having a slot therein located at the maximum camber of the wing, a sheet-like member mounted between the first and second members and being spaced from the first member to define an air duct in the wing, said duct communicating with the slot at one end, said sheet-like member and said second member having meeting trailing edges disposed forwardly of the trailing edge of the first member to form an opening at the rear of the duct, and a spanwise flap having a leading edge hinged to the meeting edges of said sheet-like member and said second member, said flap having a trailing edge movable selectively toward and away from the trailing edge of said first member, and said slot being considerably larger than the cross-sectional area of said duct.

MORRIS E. CLARK.

References Cited in the file of this patent

UNITED STATES PATENTS

| Number | Name | Date |
|---|---|---|
| 1,559,091 | Hall | Oct. 27, 1925 |
| 1,818,322 | Hall | Aug. 11, 1931 |
| 2,169,325 | Novak | Aug. 15, 1939 |
| 2,292,360 | Brewster | Aug. 11, 1942 |